CATHODE RAY BEAM DEFLECTION CIRCUIT ARRANGEMENTS

Filed Oct. 31, 1955 2 Sheets-Sheet 1

INVENTOR.
Leonard Dietch
BY
[signature]
ATTORNEY

June 11, 1957 L. DIETCH 2,795,734

CATHODE RAY BEAM DEFLECTION CIRCUIT ARRANGEMENTS

Filed Oct. 31, 1955 2 Sheets-Sheet 2

INVENTOR.
Leonard Dietch
BY
[signature]
ATTORNEY

United States Patent Office 2,795,734
Patented June 11, 1957

2,795,734

CATHODE RAY BEAM DEFLECTION CIRCUIT ARRANGEMENTS

Leonard Dietch, Haddonfield, N. J., assignor to Radio Corporation of America, a corporation of Delaware Application October 31, 1955, Serial No. 543,641

7 Claims. (Cl. 315—27)

The invention relates to circuitry for applying deflection current waves to the electromagnetic electron beam deflecting windings arranged about the electron beam path within a cathode ray tube to deflect the beam, and it particularly pertains to such circuitry incorporating means for centering the raster formed by the deflection of the electron beam and for substantially isolating the beam deflecting windings one from the other.

In present television practice, for example, an image is formed on the fluorescent screen of a cathode ray image reproducing device, or kinescope, by intensity modulating an electron beam in accordance with image information signals to vary the light point by point over a raster which is formed by deflecting the electron beam in two directions normal with respect to each other. Sawtooth deflection current waves, generated in appropriate circuits in the television receiver, are applied to the electron beam deflecting windings which are mounted in a mechanical yoke arranged about the neck of the kinescope.

Because of possible slight misalignment of kinescope parts, slight variations in component values, and the like, it is necessary to provide means for centering the scanned raster. Centering of the scanned raster may be accomplished by controlled flow of direct current through the beam deflecting windings. It is desirable to permit direct current to flow through the deflection system windings in either direction to meet any and all centering requirements. It is also desirable to restrict the flow of direct current through the windings of the output transformer as much as possible to minimize saturation of the transformer core.

In electromagnetic deflection systems of the type described, a certain amount of distributed capacity exists between horizontal and vertical beam deflecting windings. This capacity represents a relatively large portion of the effective fly-back tuning capacity of the horizontal deflection system usually employed in conventional television receivers. Such distributed capacity tends to degrade the performance of the receiver, especially as to the length of retrace time, nonlinearity of the deflection, and reduced beam deflecting power. In order to obtain an economical receiver design, this distributed inter-coil capacity must be minimized, especially in connection with television receivers designed for reproducing images in full color.

An object of the invention is to simplify the deflection circuitry of television receivers and to reduce the cost accordingly.

Another object of the invention is to provide an improved raster centering circuit operating in conjunction with the direct current flow existing in the television receiver, thereby eliminating the need for a separate source of direct current for centering.

A further object is to provide an improved circuit which will permit direct current flow in either direction through the beam deflecting windings but which will minimize the effect of direct current flow through the output transformer windings.

Still another object of the invention is to reduce the effective inter-coil or interwinding distributed capacity between the horizontal and the vertical beam deflecting windings without adding appreciably to the cost of the components.

According to the invention, at least a portion of a deflection wave output winding is bifilar wound and the resistance element of a raster centering potentiometer is connected between like electric terminals of the two separate conductors of the bifilar winding. The electron beam deflecting winding is connected between a tap or arm of the raster centering potentiometer and the other terminals of both of the two conductors of the bifilar winding. With this arrangement both terminals of the raster centering resistance element are at the same alternating current potential so that adjustment of the arm of the raster centering potentiometer will have little or no effect on the amplitude of the deflection wave applied to the electron beam deflecting winding. Any tendency for adjustment of the arm to affect the amplitude of the deflecting wave may be nullified by connecting capacitors between the arm and each of the terminals of the potentiometer. It is a distinct advantage of the circuit according to the invention that any capacitance elements so connected between the terminals of the resistance element and the arm of the raster centering potentiometer are effectively connected in parallel, reducing the capacitance required for adequate bypassing to one-half the value required in conventional centering circuits. The resistance element of the centering potentiometer is interposed in the circuit of an element of the television receiver normally energized by the receiver energizing potential supply. The anode and/or screen electrode circuits of various vacuum tubes as connected in the conventional television receivers readily lend themselves for this purpose. The direct current carrying components of the deflection system are interconnected in a closed loop effectively forming a bridge circuit. The raster centering resistance element forms two arms of the bridge and the two conductors of the bifilar winding form the other arms of the bridge. The direct potential is applied across the diagonal of the bridge defined by the terminals of the centering resistance element and the deflecting winding is connected across the other diagonal. Thus the centering direct current may be made to flow through the beam deflecting winding in either direction with the current flow through each of the conductors of the bifilar winding continuously in the same direction. However, the direct current flow in one conductor of the bifilar winding will be in a direction opposite to the current flow in the other conductor of the bifilar winding, whereby the tendency for saturation of the transformer core due to the flow of direct current in one conductor is nearly offset by the flow of direct current in the other conductor. Under balanced bridge conditions, the tendency is completely counteracted.

Further according to the invention, a given electron beam deflecting winding is effectively isolated from the reference alternating current flowing in the other electron beam deflecting winding by applying the deflection wave and the centering current to the given beam deflecting winding through a bifilar winding on the output transformer supplying the deflection wave to the other beam deflecting winding. This bifilar winding is effective to elevate the potentials applied to the given deflecting winding to the reference alternating potential of the other deflecting winding, whereby the effective interwinding capacity between the two beam deflecting windings is reduced to half the value encountered in conventional deflection systems.

In order that the practical aspects may be more fully appreciated and readily obtained in practice, specific circuit arrangements according to the invention, given by way of example only, are described with reference to the accompanying drawing, in which.

Figure 1:
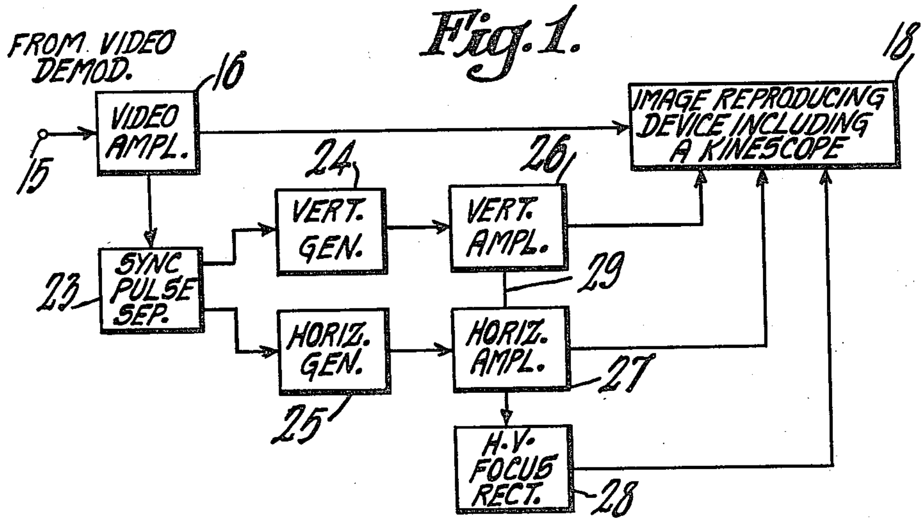
Fig. 1 is a functional diagram of portions of a television receiver which may incorporate circuitry according to the invention.

Fig. 1 shows the functional relationship between portions of a television receiver, of which some portions may be entirely conventional while others may incorporate circuity according to the invention. In a television receiver having such portions, television signals appearing at an antenna are applied to radio frequency (R.-F.) amplifying circuit and the output therefrom is applied along with a wave from a local oscillation generating circuit to a frequency converting circuit. The output of the frequency converting circuit is applied to an intermediate frequency (I.-F.) circuit which may be an individual picture I.-F. amplifying circuit or one amplifying both picture and sound I.-F. signals. A video demodulating circuit is coupled to the picture I.-F. amplifying circuit for for deriving the composite video wave from the television signals. The detected composite video wave is applied at input terminals 15 to a video frequency (V.-F.) amplifying circuit 16. The image information bearing portions of the video wave are applied, through the intermediary of luminance and chrominance signal handling circuitry in the case of a color television receiver, to the input circuit of an image reproducing device 18 of the type including a cathode ray tube, or kinescope. Sound signals may be derived from one of the foregoing circuits in known manner and further processed in known circuitry for driving a sound reproducing device, usually a speaker.

The output of the composite video wave is also applied to a synchronizing pulse separating circuit 23 to separate the synchronizing pulses from the image information and to separate the vertical synchronizing pulses from the horizontal. The vertical synchronizing pulses are applied to a vertical deflection wave generating circuit 24, and the horizontal synchronizing pulses are applied to a horizontal deflection wave generating circuit 25. The vertical and horizontal deflection waves are applied to vertical and horizontal deflection wave amplifying circuits 26 and 27 for producing alternating current electron beam deflecting waves for application to the deflection components of the image reproducing device 18. An automatic gain control (A.-G.-C.) voltage amplifying and distributing network may be coupled to the V.-F. amplifying circuit 16 or the synchronizing pulse separating circuit 23 and gated by a pulse wave obtained from the horizontal deflection wave amplifying circuit 27 to supply control potential to the desired ones of the circuits previously mentioned. Usually the R.-F. and I.-F. amplifying circuits at least are so supplied. A high voltage and/or focus voltage rectifying circuit 28 is coupled to the horizontal deflection wave amplifying circuit 27 to supply ultor and/or focus potentials to the kinescope of the image reproducing device 18. A low voltage power supply, usually in the form of a rectifier operating from the alternating current (A.-C.) power line, is arranged to supply direct energizing potential to the horizontal and vertical deflection wave amplifying circuits 26, 27 and all other circuits requiring direct potential energization.

Either or both of the deflection wave amplifying circuits 26, 27 may incorporate the improved raster centering circuit arrangement according to the invention. In addition the deflection wave from one of the deflection wave amplifying circuits 26 or 27 may be applied to the electron beam deflection circuitry of the image reproducing device 18 through deflecting winding isolating circuitry according to the invention, which circuitry is coupled to the other deflection wave amplifying circuit 27 or 26 as indicated by the functional lead 29.

Figure 2:
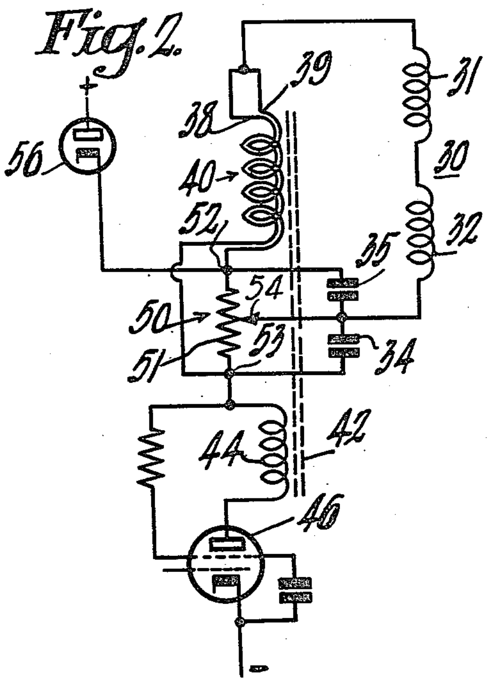
Fig. 2 is a schematic diagram illustrating the underlying principles of the centering circuit according to the invention.

Fig. 2 is a schematic diagram illustrating a raster centering circuit arrangement according to the invention. A beam deflecting winding 30, conventionally comprising two sections 31, 32, in parallel or in series as shown, is part of the image reproducing device 18 and is arranged in a mechanical yoke for deflecting electron beam of a kinescope forming a part of the image reproducing device 18. A pair of coupling capacitors 34, 35 respectively couple one terminal of the deflection system winding 30 to like electric terminals of a pair of conductors 38, 39 arranged as a bifilar winding 40. The other terminals of the conductors 38, 39 are connected in common to the other terminal of the deflecting winding 30. Alternating current (A.-C.) waves are induced in the bifilar winding 40 by inductive coupling, which may include a core 42 of magnetic material, to another winding 44. Alternating potential may be impressed across the primary winding 44, for example, by means of an electron discharge device 46 to the input circuit of which suitable deflection excitation potential is applied.

Direct current for centering the electron beam deflection is obtained by diverting current flow in various arms of a direct current (D.-C.) bridge through the deflecting winding 30. The D.-C. bridge is constituted by raster centering potentiometer 50, having a resistance element 51 with end terminals 52 and 53, and the bifilar winding conductors 38, 39. Two arms of the bridge are constituted by the resistance element 51 as determined by the adjustment of the arm 54, while the remaining arms of the bridge are constituted by the bifilar winding conductors 38, 39. The deflecting winding 30 is connected across that diagonal of the bridge between the junction of the bifilar winding conductors 38, 39 and the arm 54 of the centering potentiometer 50. The remaining diagonal of the D.-C. bridge at the terminals 52, 53 is interposed in a circuit in which direct current is flowing. This is readily accomplished according to the invention by connecting one terminal 52 of the bridge to a point of positive energizing potential in the associated television receiver, and connecting the other terminal 53 of the bridge to a point of potential negative with respect to the positive potential. For example, as illustrated in Figure 2, the above-mentioned connection from bridge terminal 53 may be made through the primary winding 44 and the anode-to-cathode path of the electron discharge device 46 and through the screen-to-cathode electrode circuit of the electron discharge device 46, and the above-mentioned connection from bridge terminal 52 may be made through the cathode-to-anode path of the damping electron discharge device 56 is desired. Alternatively, electron discharge devices clearly disassociated with the deflection system in so far as A.-C. operation is involved may be substituted for the suggested devices 46 and 56 for connecting the terminals 52 and 53 of the bridge circuit to the energizing source for the proper direct current flow.

Figure 3:
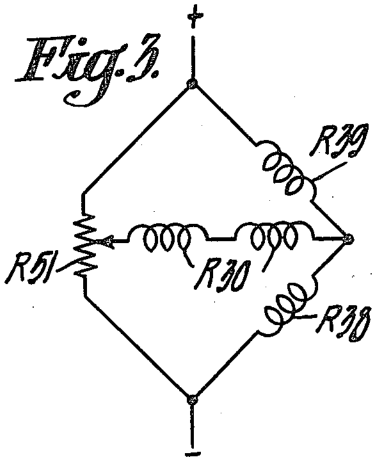
Fig. 3 is an equivalent circuit diagram useful in explaining the operation of the centering circuit according to the invention.

The operation of the direct current bridge may be better understood by referring to Fig. 3, which is an equivalent direct current circuit of the centering arrangement shown in Fig. 2. Since only direct current flow is involved in the circuit of Fig. 3, all of the circuit elements should be considered as resistance elements, although in order to more readily correlate the components the inductance symbol is used at pertinent points.

It will be appreciated that the current through the bridge circuit flows in two parallel paths. The first path includes the component R51 of the resistance element 51 of the potentiometer, while the second path includes series connected resistance elements $R_{39}$ and $R_{38}$ representative of the resistive component of the bifilar winding conductors 38, 39. The resistive component of the deflection system winding 30 is represented by the resistance element $R_{30}$ connected across the bridge from the movable contact on the resistance element 51 of the potentiometer to the junction between the inductors 38, 39. It will be seen from studying the equivalent circuit of Fig. 3, that there will be no direct current flow when the tap on the resistance element 51 is at the point for which the bridge is balanced. This will be both the mechanical and electrical centers of a linear resistance potentiometer but only the electrical center of nonlinear potentiometers. It will be appreciated that direct current can be made to flow in either direction in the deflecting winding by unbalancing the bridge circuit in one direction or the other, and the intensity of the direct current flowing through the deflecting winding will be proportional to the degree of unbalance. The arm 54 is maintained at the alternating potential of the terminals 52, 53 of the resistance element 51 by means of the coupling or bypass capacitors 34, 35. Therefore movement of the arm 54 on the resistance element 51 has no effect on the alternating potential wave impressed on the deflection system winding 30. Thus direct current can be made to flow in a given single direction and of desired intensity in the deflecting winding 30 without in any way affecting the flow of alternating current in the winding. In some instances, with low resistance elements as in the vertical deflection system of a television receiver for example, the bypass capacitors may be omitted without appreciably affecting the amplitude of the alternating potential wave.

Figure 4:
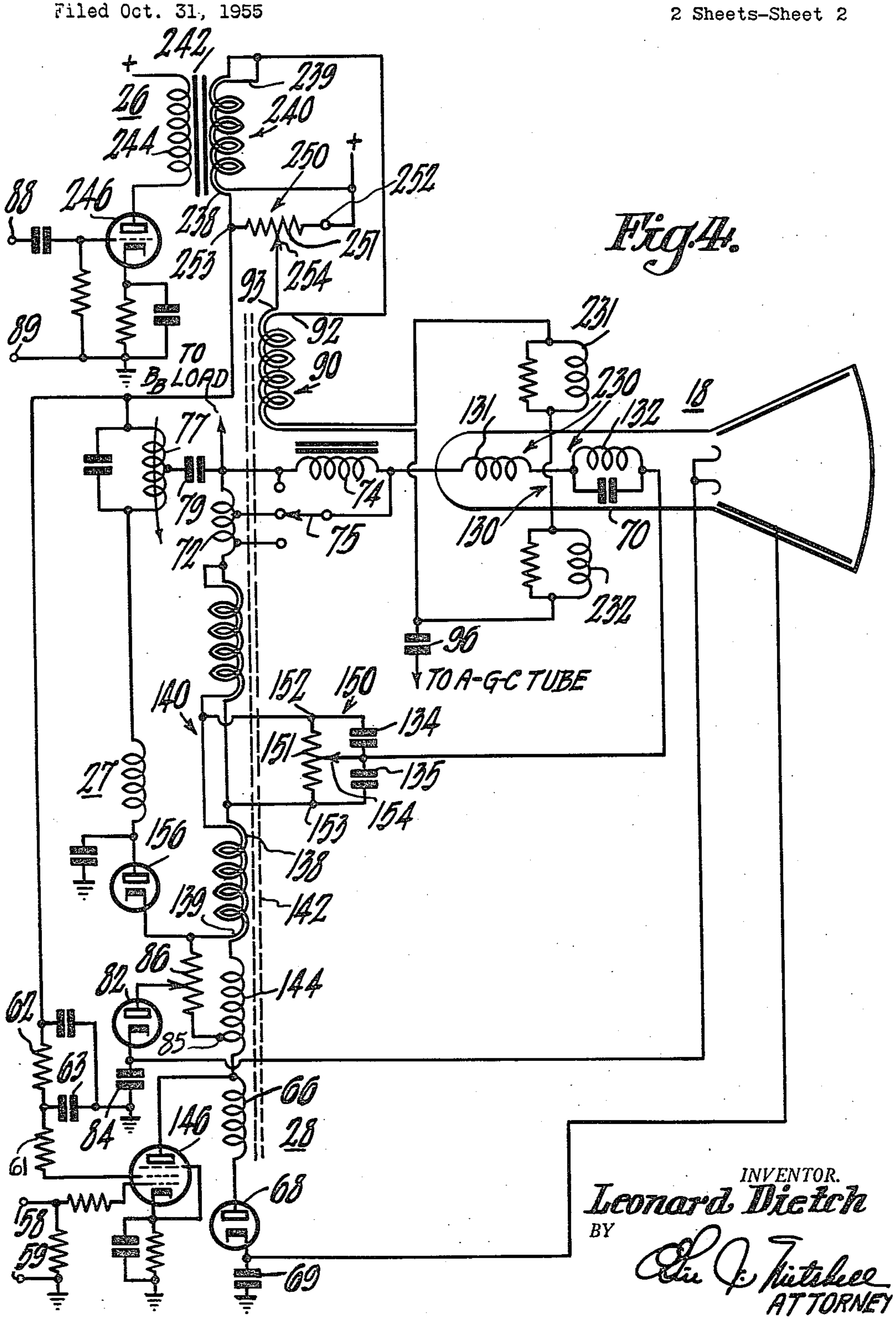
Fig. 4 is a schematic diagram of a television receiver kinescope deflection circuit arrangement according to the invention.

An example of television receiver incorporating circuitry according to the invention is shown in Fig. 4. In this figure components corresponding to the components shown in Fig. 2 are indicated by the same reference numeral used in Fig. 2 raised by a factor of 100 for the horizontal deflection system and the same reference numeral raised by a factor of 200 for the vertical deflection system. For example, the horizontal centering potentiometer 150 and the vertical centering potentiometer 250 in Fig. 4 correspond to the centering potentiometer 50 shown in Fig. 2.

Referring specifically to Fig. 4, a sawtooth deflection wave is applied at terminals 61, 62 connected to the control grid cathode circuit of the horizontal output amplifying electron discharge device, shown as a beam power pentode amplifying tube 146. The screen electrode of the pentode 146 is energized by means of series connected resistors 61, 62 connecting the screen to a point of positive operating potential and is bypassed to a point of fixed reference potential, shown as ground by means of capacitors 63, 64. The deflection waves are developed in a primary winding portion 144 of a transformer having a ferrite core 142. A high voltage winding 66 is arranged on the transformer core 142 and connected between the anode of the pentode tube 146 and the anode electrode of a high voltage rectifying device 68. High voltage flyback pulses appearing in the high voltage winding 66 are applied by the rectifying device 68 to a storage capacitor 69 thereby maintaining the ultor of the kinescope 70 above reference potential, shown as ground, at a steady high voltage level.

While the output portion of the deflection winding may comprise a single bifilar winding as shown in Fig. 2, it is desirable that a tapped winding portion 72 as shown in Fig. 4 be provided to enable some adjustment of the amplitude of the horizontal deflection wave, or "width" of the raster, to accommodate the existing A. C. power line voltage level and to provide some adjustment as the tubes in the television receiver age. A width choke 74 and a width adjusting switch 75 may therefore be connected as shown between the A. C. reference potential end of the winding 72 and the deflecting winding section 131. The other deflecting winding section 132 is connected between the first section 131 and the arm 154 of the horizontal centering potentiometer 150. The end terminals 152, 153 of the potentiometer resistance element 151 are connected to the individual conductors 139, 138 at the proper points for matching the impedance of the beam deflecting winding 130 to the output portion of the transformer winding. The bifilar winding portion 140 comprises a number of turns sufficient to locate the cathode of the damping electron discharge structure at the proper alternating potential point for linear horizontal sweep or deflection of the cathode ray beam in the kinescope 70.

In actual practice with transformers of the type shown, the high voltage winding 66, which produces a high potential at a low value of current, is usually wound with a single conductor of rather fine wire. The remainder of the winding is usually polyfilar throughout in order to reduce A. C. copper losses. Thus the invention may be applied to conventionally wound transformers at only the expense of separating the conductors at one or more of the usual taps and providing additional terminals for the separated conductors. In the interest of clarity, however, only those portions of the winding which are desirably bifilar for the purposes of the present invention are so indicated in Fig. 4.

The positive most terminal 152 of the centering potentiometer 150 is connected to the direct potential energizing lead of the receiver through a damping tube 156 and a linearity controlling inductor 77. A capacitor 79 connected between a tap on the linearity controlling inductor 77 and the A. C. reference potential point of the tapped winding portion 72 completes a known energizing potential boosting circuit for increasing the anode of the horizontal deflection wave amplifying tube 146 to approximately twice the value supplied by the low voltage power supply. The lower most terminal 153 of the centering potentiometer 150 is returned to the point of reference potential, shown as ground, through the primary portion 144 of the winding and the anode-to-cathode path of the pentode tube 146. An adjustably tapped resistor 86 is coupled between a tap 85 on the primary winding portion 144 of the winding and the tap to which the cathode of the damper structure 156, provides an adjustable pulse input to the focus rectifier circuit, which comprises a focus rectifier tube 82 and a charging capacitor 84 and which supplies positive potential for the focus electrode of the kinescope 70. The raster centering bridge circuit operates in the same manner as described in connection with the circuit of Fig. 2. While there is actually a difference in direct current flow in the conductors of the bifilar winding portion, except in the special case where the bridge circuit is balanced, the currents offset each other to such extent that in practice any tendency for core saturation is readily eliminated by a slight increase in the air gap.

A vertical deflection sawtooth wave is applied at input terminals 88, 89 coupled to the grid-cathode circuit of a vertical deflection wave amplifying tube 246. Vertical deflection sawtooth waves are induced in the conductors 238, 239 of a bifilar winding 240 coupled by means of an iron core 242 to a primary winding 244 connected to the anode of the vertical deflection wave amplifying tube 246. A vertical raster centering potentiometer 250 is connected to the bifilar vertical deflection wave output winding 240 to constitute a bridge circuit as previously described. The positive most terminal 252 of the vertical centering potentiometer 250 is connected to a point of direct energizing potential, while the other terminal 253 is connected through the series resistors 61, 62 to the screen electrode and through the previously described circuitry to the anode electrode of the horizontal deflection wave amplifying tube 146. In some applications it may be found that the screen current requirements of the horizontal deflection wave amplifying tube are of the proper order for producing the desired direct current flow through the vertical centering potentiometer 250, although an increase in potentiometer resistance may be necessary for the purpose of any circuits in which the current fluctuates with signal strength, such as the I.-F. amplifying tubes, should be avoided as the resulting variations in centering are undesirable.

If the vertical centering current source which is a portion of the vertical centering potentiometer 250 and which is at A.-C. reference potential, or ground, were connected directly to the vertical deflection system winding 230, a substantial intercoil capacitance would be presented across the horizontal deflection system winding 130. A more complete explanation of this phenomenon will be found in the copending U. S. application, Serial No. 505,166, filed May 2, 1955, for "Deflection Isolation Circuitry," by Leonard Dietch. Therefore the vertical deflection system winding 230 is elevated to the horizontal frequency A.-C. potential by means of a bifilar winding 90 on the transformer coil 142 of the horizontal deflection wave transformer. The bifilar winding 90 comprises two conductors 92, 93 of sufficient number of turns to raise the potential of the vertical deflection system winding 230 to the same value as found at the midpoint of the horizontal deflection system winding 130. The terminals of the bifilar conductors 92, 93 which are at A.-C. ground potential with respect to the horizontal deflection frequency may then be connected to the vertical centering potentiometer, which is also at ground potential with respect to the horizontal deflection frequency. This completes a bridge circuit substantially as shown in Fig. 3 but with the addition of the low resistance components of the elevator winding 90 in series with the resistance component of the deflecting winding. Vertical deflection wave current passing through the conductors 92, 93 of the horizontal transformer bifilar winding 90 will have no effect on the horizontal deflection wave circuit since opposing currents of equal magnitude flow in the two conductors.

An additional advantage of the isolating arrangement shown is that a pulse train of horizontal repetition rate and the desired amplitude is available across the bifilar winding 90 and is readily applied by means of a coupling capacitor 96 to the A.-G.-C. gating tube. The saving of a separate A.-G.-C. voltage tap at least partly offsets the cost of the bifilar winding 90.

In addition the centering bypass capacitors 134, 135 may be simple paper capacitors of low capacity which are relatively inexpensive as compared to both the low capacity polarized and high capacity nonpolarized electrolytic capacitors used in the prior art centering arrangements. Further saving is effected in eliminating the requirement for a center tap on the resistance elements of each of the centering potentiometers and the elimination of a separate centering choke coil. These savings more than offset the slightly increased cost of the horizontal deflection wave transformer entailed in bringing out separate taps for the separate conductors of the winding.

A substantial improvement in operation was obtained with a receiver designed for color television image reproduction modified along the lines shown in Fig. 4 and using the pertinent component parts values as listed below.

| Ref. No. | Component | Type or Value |
|---|---|---|
| 61 | Screen dropping resistor | 56 ohms. |
| 62 | do | 11 ko. |
| 63 | Screen bypass capacitor | 0.1 mf. |
| 64 | do | 0.22 mf. |
| 74 | Width choke | 0.5 mh. |
| 76 | Horizontal tuning capacitor | 0.15 mf. |
| 77 | Linearity control | 1 mh. |
| 79 | Potential boosting capacitor | 0.1 mf. |
| 82 | Focus rectifier tube | 1V2. |
| 84 | Focus filter capacitor | 1,000 mmf. |
| 86 | Focus adjusting potentiometer | 250 ko. |
| 92, 93 | Elevator winding conductors | 3 ohms D.-C. |
| 96 | A.-G.-C. coupling capacitor | 470 mmf. |
| 131, 132 | Horizontal beam deflecting winding | 60 ohms D.-C. |
| 135 | Horizontal A.-C. coupling capacitors | 0.47 mf. |
| 146 | Horizontal deflection wave amplifier | 6CD6. |
| 150 | Horizontal centering potentiometer | 100 ohms. |
| 156 | Damping tube | 6AU4. |
| 231, 232 | Vertical beam deflecting winding | 60 ohm D.-C. |
| 246 | Vertical deflection wave amplifier | 6AQ5. |
| 250 | Vertical centering potentiometer | 40 ohms. |

The low voltage power supply developed approximately 385 volts between the points marked plus (+) sign and the point of reference potential, shown as ground.

The invention claimed is:

1. A circuit for electromagnetically deflecting and centering the electron beam of a cathode ray tube, including a given source of currents for deflecting said beam in a given direction, another source of currents for deflecting said beam in another direction, a first transformer including two bifilar windings and coupled to said given source of currents, a beam deflecting winding having first and second terminals, said first terminal being connected to similar ends of both of the conductors of one of said bifilar windings, a beam centering potentiometer having respective terminals individually connected to the other ends of the conductors of said one bifilar winding and an adjustable arm connected to the second terminal of said beam deflecting winding, means to apply direct energizing potential across the terminals of said centering potentiometer, a second transformer including a bifilar winding coupled to said other source of deflecting currents, another beam deflecting winding connected to like electric terminals of the conductors of the other of said bifilar windings on the first transformer, means connecting like electric terminals of both conductors of said second transformer's bifilar winding to the other terminal of one of the conductors of said other bifilar winding, a second beam centering potentiometer having two terminals individually connected to the other terminals of the conductors of said second transformer's bifilar winding and an arm connected to the remaining terminal of the remaining conductor of said other bifilar winding, and means connecting said direct energizing potential means across the terminals of said second beam centering potentiometer.

2. A circuit for electromagnetically deflecting and centering the electron beam of an image reproducing kinescope in a television receiver, including a horizontal deflection wave amplifying circuit comprising an electron discharge device having cathode, control, screen and anode electrodes, a source of direct potential for energizing the circuits of said television receiver, a horizontal deflection wave transformer having two bifilar windings, said transformer also including another winding having a first terminal connected to the anode of said electron discharge device and having a second terminal, a horizontal beam deflecting winding having one terminal coupled to both of the conductors of one of said bifilar windings and having another terminal, a horizontal raster centering potentiometer having terminals individually connected to the other ends of the conductors of said one bifilar winding and an adjustable arm connected to the other terminal of said horizontal beam deflecting winding, bypass capacitors connected between said arm and the individual terminals of said raster centering potentiometer, means connecting the second terminal of said other winding to one terminal of said centering potentiometer, a damping electron discharge structure having a cathode connected to the other terminal of said centering potentiometer and an anode, means connecting said source of direct energizing potential between the anode of said structure and the cathode electrode of said electron discharge device, a vertical deflection wave translating circuit including an output transformer having a bifilar winding, a vertical beam deflecting winding connected to like electric terminals of the other of said bifilar windings on said horizontal deflection wave transformer, means connecting like electric terminals of both conductors of said vertical output transformer bifilar winding to the other terminal of one of the conductors of said other horizontal bifilar winding, a vertical raster centering potentiometer having two terminals individually connected to the other terminals of the conductors of the vertical bifilar winding and an arm connected to the remaining terminal of the remaining conductor of said other horizontal bifilar winding, means connecting one terminal of said vertical raster centering potentiometer to said source of direct energizing potential, and means connecting the other terminal of said vertical raster centering potentiometer to the screen electrode of said electron discharge device.

3. In a deflection system for deflecting the electron beam of a cathode ray tube, a beam deflecting winding and a source of deflecting wave voltage, a beam centering control comprising a potential dividing resistance element having two terminals and an adjustable contact, a bifilar winding having one pair of adjacent terminals interconnected and another pair of adjacent terminals individually connected to the two terminals of said potential dividing resistance element, means coupled between said source of deflecting wave voltage and said bifilar winding to induce a deflection current wave in said bifilar winding, means coupling said beam deflecting winding between the interconnected terminals of said bifilar winding and the adjustable contact of said potential dividing resistance element, a load impedance element having one terminal connected to one terminal of said potential dividing resistance element and having another terminal, and means to apply a direct energizing potential between the other terminal of said potential dividing resistance element and the other terminal of said load impedance element, whereby adjustment of said contact on said potential dividing resistance element serves to vary the intensity and direction of flow of direct current through said deflecting winding while maintaining the amplitude of said deflecting current wave substantially unchanged.

4. In a deflection system for deflecting the electron beam of a cathode ray tube, a beam deflecting winding and a source of deflecting wave voltage, a raster centering control comprising a potential dividing resistance element having two terminals and an adjustable contact, a bifilar winding having one pair of adjacent terminals interconnected and another pair of adjacent terminals individually connected to the two terminals of said potential dividing resistance element, means coupled between said source of deflecting wave voltage and said bifilar winding to induce a deflection current wave in said bifilar winding, means coupling said beam deflecting winding between the interconnected terminals of said bifilar winding and the adjustable contact of said potential dividing resistance element, a pair of bypass capacitors having terminals individually connected to the terminals of said bifilar winding conductors connected to the terminals of said resistance element and having other terminals connected in common to said adjustable contact to maintain said adjustable contact at the alternating potential existing at said terminals, a load impedance element having one terminal connected to one terminal of said potential dividing resistance element and having another terminal, and means to apply a direct energizing potential between the other terminal of said potential dividing resistance element and the other terminal of said load impedance element, whereby adjustment of said contact on said potential dividing resistance element serves to vary the intensity and direction of flow of direct current through said deflecting winding while maintaining the amplitude of said deflecting current wave substantially unchanged.

5. A circuit arrangement for deflecting the electron beam of a cathode ray television image reproducing tube by means of a beam deflecting winding associated with said tube, including a deflection wave output transformer having a primary winding portion and a bifilar winding portion comprising at least two conductors having one set of like electric terminals interconnected, means connecting the other terminal of one of said bifilar conductors to a point of positive direct energizing potential, means connecting the other terminal of the other of said bifilar conductors to a point of relatively negative direct potential, means to apply a deflection wave across said primary winding portion to induce a deflection current wave in said bifilar winding portion, a potential dividing resistance element having an adjustable tap and two terminals individually connected to said bifilar conductors at like deflection wave potential points remote from said interconnected terminals, and means connecting said beam deflecting winding between said interconnected terminals of said bifilar winding and the adjustable contact of said potential dividing resistance element, whereby adjustment of said contact serves to vary the direction and intensity of direct current flow through said beam deflecting winding without substantially affecting the amplitude of the deflection current wave flowing through said beam deflecting winding.

6. A circuit arrangement for deflecting the electron beam of a cathode ray television image reproducing tube by means of a beam deflecting winding associated with said tube, including a deflection wave output transformer having a primary winding portion and a bifilar winding portion comprising at least two conductors having one set of like electric terminals interconnected, means connecting the other terminal of one of said bifilar conductors to a point of positive direct energizing potential, means connecting the other terminal of the other of said bifilar conductors to one terminal of said primary winding portion, and an electron discharge device having a cathode electrode connected to a point of fixed reference potential, a control electrode, and an anode electrode connected to the other terminal of said primary winding portion, means to apply a deflection wave between the control and cathode electrodes of said electron discharge device to induce a deflection current wave in said difilar winding portion, a potential dividing resistance element having an adjustable tap and having two terminals individually connected to said bifilar conductors at like deflection wave potential points remote from said interconnected terminals, and means connecting said beam deflecting winding between said interconnected terminals of said bifilar winding and the adjustable contact of said potential dividing resistance element, and bypass capacitors having terminals individually connected to said bifilar winding conductors at said like potential points and terminals connected in common to said adjustable contact, whereby adjustment of said contact serves to vary the direction and intensity of direct current flow through said beam deflecting winding without affecting the amplitude of the deflection current wave flowing through said beam deflecting winding.

7. An electromagnetic cathode ray tube electron beam deflection circuit arrangement including, a deflection wave transformer having at least one winding comprising at least two bifilar wound conductors and another winding comprising at least one conductor arranged to deliver substantially twice the voltage delivered across said one winding, one beam deflecting winding mounted in a yoke arranged about the electron beam path within said cathode ray tube, means connecting said one beam deflecting winding across said other winding of said deflection wave transformer, another beam deflecting winding mounted in said yoke and arranged to deflect the electron beam within said cathode ray tube in a path normal to the deflection by said one deflecting winding, means connecting the terminals of said other beam deflecting winding individually to like electric terminals of the conductors of said one bifilar winding, means to induce deflection wave currents of one frequency in the windings of said transformer, and means connected to the remaining terminals of the conductors of said one winding to apply thereto deflection wave currents of another frequency.

No references cited.